(12) United States Patent
Skygebjer

(10) Patent No.: US 7,415,615 B2
(45) Date of Patent: Aug. 19, 2008

(54) METHOD AND SYSTEM FOR USER AUTHENTICATION IN A DIGITAL COMMUNICATION SYSTEM

(75) Inventor: Per Skygebjer, Göteborg (SE)

(73) Assignee: TDS Todos Data System AB, Gothenburg (SE)

( * ) Notice: Subject to any disclaimer, the term of this patent is extended or adjusted under 35 U.S.C. 154(b) by 491 days.

(21) Appl. No.: 10/508,605

(22) PCT Filed: Mar. 25, 2003

(86) PCT No.: PCT/EP03/03087

§ 371 (c)(1), (2), (4) Date: Sep. 23, 2004

(87) PCT Pub. No.: WO03/081545

PCT Pub. Date: Oct. 2, 2003

(65) Prior Publication Data

US 2005/0216744 A1    Sep. 29, 2005

(30) Foreign Application Priority Data

Mar. 25, 2002 (EP) .................................. 02006780

(51) Int. Cl.
*H04L 9/32* (2006.01)
*G06F 15/16* (2006.01)
*G06K 7/01* (2006.01)

(52) U.S. Cl. ..................... 713/184; 726/9; 235/382.5

(58) Field of Classification Search .................. 713/185
See application file for complete search history.

(56) References Cited

U.S. PATENT DOCUMENTS

| 5,317,636 | A | | 5/1994 | Vizcaino ........................ 705/65 |
| 5,592,553 | A | | 1/1997 | Guski et al. ................... 713/159 |
| 5,627,355 | A | * | 5/1997 | Rahman et al. ............... 235/380 |
| 5,971,272 | A | * | 10/1999 | Hsiao ........................... 235/380 |
| 5,988,497 | A | * | 11/1999 | Wallace ..................... 235/382.5 |
| 6,067,621 | A | * | 5/2000 | Yu et al. ........................ 713/172 |
| 6,834,270 | B1 | * | 12/2004 | Pagani et al. ................... 705/65 |
| 6,908,030 | B2 | * | 6/2005 | Rajasekaran et al. ......... 235/379 |
| 6,993,666 | B1 | * | 1/2006 | Hokkanen et al. ............... 726/5 |
| 7,111,172 | B1 | * | 9/2006 | Duane et al. .................. 713/182 |
| 2004/0236819 | A1 | * | 11/2004 | Anati et al. .................. 709/200 |

FOREIGN PATENT DOCUMENTS

| WO | WO 01/26061 A1 | 4/2001 |
| WO | WO 02/01325 A1 | 1/2002 |

* cited by examiner

*Primary Examiner*—Christian LaForgia
(74) *Attorney, Agent, or Firm*—Harness, Dickey & Pierce, P.L.C.

(57) ABSTRACT

A method and a system for authentication and synchronization is disclosed. The user provides a first one time code (OTC) to the authentication manager. If this OTC is within a small access window, the user is directly authenticated and granted access to the system. If the provided OTC is outside the small window but within a big window, the authentication manager saves the first OTC, and a second OTC is required from the user. If the new, second OTC and the first OTC are in sequence, the end user will be authenticated, and admitted access to the system and the requested service.

14 Claims, 3 Drawing Sheets

METHOD AND SYSTEM FOR USER AUTHENTICATION IN A DIGITAL COMMUNICATION SYSTEM

FIELD OF THE INVENTION

The present invention relates to a method and a system for authentication in digital communication systems.

BACKGROUND OF THE INVENTION

The need for secure electronic transactions and access to remote services involving a user and a transaction system such as an Internet based shopping site, Internet banking or an automatic teller machine (ATM) at a bank, has increased dramatically during recent years. A major question relating to secure transactions is that of authentication of the user to the system. That is, how to identify a user as being the owner of, e.g., a bank account from which the user is to withdraw money from when using an ATM or Internet banking services.

A well-established method of authenticating users in such systems is that of providing the user with an electronically readable device containing information about the user and his account. Such cards are common and contain magnetically stored information. In order to allow the user to use his card in an ATM, the issuer (e.g. the bank) has provided the user with a secret code to be supplied to the ATM when using the card. The code is used to "unlock" the card for use by the user every time the user makes use of his card.

However, a drawback of such a method is that one and the same code is used every time a user authenticates with a system. This increases the risk of unauthorized use of the card if the user loses the card.

To this end, solutions have been developed using different codes from occasion to occasion, so called one time codes (OTCs). Such OTCs could be provided to the user by means of a sequence of codes to be used one time each, and perhaps in a pre-determined order. Alternatively, the OTCs could be generated by means of portable code-generating devices, in which a new code is generated each time it is used, based on personalizing information provided by the user, such as a personal PIN-code. Such devices are generally of two types. A first type is specifically developed gadgets with entering means such as a keyboard, a display, a processor for generating the code, etc. A second type relates to so called smart cards or integrated circuit card (ICC), i.e. cards provided with a chip. For example, the document WO 02/01325 of the same applicant discloses such an authentication system using OTCs.

However, a problem in using OTCs is the problem of synchronizing the code generation/selection process at the user side and in the authentication manager, respectively. In case the processes are unsynchronized, the user will not be authenticated and authorized to access the required services or the like, even though a correct OTC was entered. Synchronization could be achieved by keeping and updating synchronization data, such as a sequence number, a time value or the like, in the same way at both user side and the authentication manager side. However, the synchronization data could easily become unsynchronized, for example due to manual errors, failed authentication attempts, different clock rates, etc.

Attempts have been made in the past to alleviate this problem. For example, several acceptable OTC could be generated or selected at the authentication manager, e.g. corresponding to a sequence of synchronization data. However, hereby the security level decreases, and the problem is only partly solved, since the sequence, or window, of acceptable OTCs may still not be enough to handle the occurred unsynchronization.

Another known solutions attempts to restore the synchronization. However, these known solutions are generally very cumbersome and tedious for the user, and may also imply a security hazard.

SUMMARY OF THE INVENTION

It is therefore an object of the present invention to provide an improved method and system for user authentication, which is easier and faster to use and/or is more secure.

This object is achieved with a method and a system according to the appended claims.

According to one aspect of the invention, a method is provided for authenticating a user in a digital communication system, said system comprising at least one input device providing a user interface to the system, an authentication manager for authenticating the user to the system and a communication network connecting said input device and said authentication manager. The method comprises the steps:

receiving identification information about the user at said authentication manager from said input device;

receiving an one time code (OTC) at said authentication manager from said input device;

identifying, based on said identification information, a sequence of verification OTCs associated with said user;

choosing at least one of the verification OTCs of said sequence to be the most probable for authentication; and comparing the chosen verification OTC and the OTC received from the input device, and in case of a match authenticating the user to the system; and in case of a non-match:

requiring, at least once, a new OTC from the user;

searching at least a part of the remaining sequence of verification OTCs for verification OTCs in sequence matching the OTCs received from the user; and in case of a second match authenticating the user to the system.

According to this method, a very smooth, efficient but still secure authentication process is provided. The first OTC provided by the user is verified against a small access window, comprising one or several most probable verification OTCs held by the authentication manager. Typically the small access window comprises four OTCs. In most cases, the synchronization deviation would be within this tolerance, whereby the user would be unaffected by this deviation. In fact, this slight synchronization deviation would be totally unnoticeable for the user. The deterioration in the security level of the system due to the size of this small access window is for normal applications insignificant. In case the OTC provided by the user is outside the small access window, the OTC is normally either erroneous, or due to a slightly larger synchronization offset. This last case is handled in a very efficient way by the request of a further OTC. By checking the sequential relation between the first and second OTC, verification could be made with a very high degree of security, while minimizing the required user interaction. Hereby, the process becomes very efficient, fast and easy to use, and at the same time, the security level is not significantly deteriorated.

In one embodiment, the OTC from the input device is generated by means of a OTC generation unit. E.g. the generation units is adapted to generate the OTC based on input provided by a smart card held by the user.

Preferably, the OTC generation unit calculates the OTC based on synchronization data, such as a sequence number or a time value. In that case, the step of choosing the most probable one of the verification OTCs could be made based on verification synchronization data held by the authentication manager.

Thereafter, in case of a second match authenticating the user to the system, the verification synchronization data could be updated in accordance with the identified matching verification OTCs.

The step of identifying a sequence of verification OTCs associated with said user could comprise the step of calculating a sequence of OTCs.

Alternatively, the step of identifying a sequence of verification OTCs associated with said user could comprise the step of retrieving a sequence of pre-stored OTCs.

The OTCs are preferably non-recurring strings of characters.

Further, the identification information could comprise an identification code associated with the user.

Still further, at least part of the communication between the input device and the authentication manager could be encrypted.

According to another aspect of the invention, a corresponding authentication system is provided for authenticating a user in a digital communication system, the communication system comprising at least one input device providing a user interface to the system and an authentication manager for authenticating the user to the system and a communication network connecting said input device and said authentication manager. The system comprises:

- means for receiving identification information about the user at said authentication manager from said input device;
- means for receiving an one time code (OTC) at said authentication manager from said input device;
- means for identifying, based on said identification information, a sequence of verification OTCs associated with said user;
- means for choosing at least one of the verification OTCs of said sequence to be the most probable for authentication; and
- means for comparing the chosen verification OTC and the OTC received from the input device, and in case of a match authenticating the user to the system;
- means for requiring a second OTC from the user;
- means for searching at least a part of the remaining sequence of verification OTCs for verification OTCs in sequence matching the OTCs received from the user; and
- in case of a second match authenticating the user to the system.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

For exemplifying purposes, the invention will be described in closer detail in the following with reference to embodiments thereof illustrated in the attached drawings, wherein.

DESCRIPTION OF PREFERRED EMBODIMENTS

The invention will now be described more thoroughly by way of example.

Figure 1:
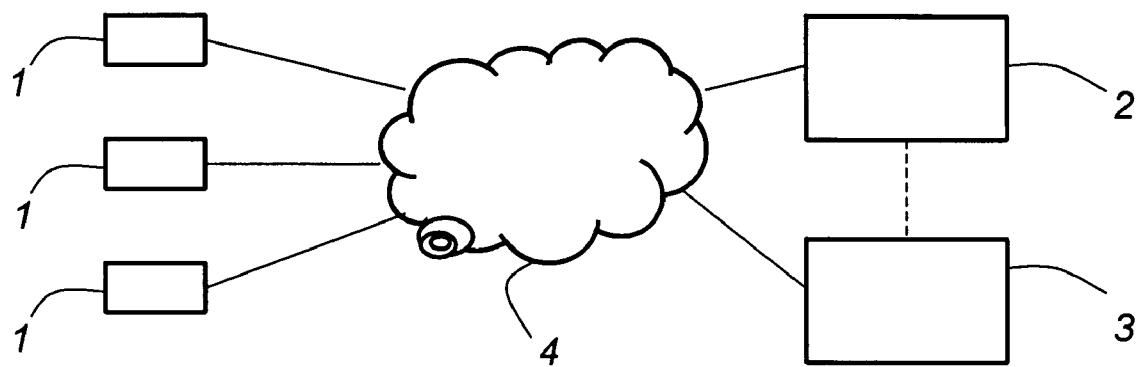
FIG. 1 is a schematic system overview of a system according to an embodiment of the invention.

With reference to FIG. 1, the invention generally relates to an authentication in a digital communication system. The system comprises at least one input device 1, and preferably several input devices. The input device could be any device which provides a digital network interface for user, such as a general purpose computer, an ATM, a cellular telephone or the like. Further, the system comprises at least one authentication manager 2 for authenticating the user to the system. The authentication manager could be arranged as a server on the network, and could either be integrated with a service provider 3 for which authenticated is required, or be connected to such a service provider in any suitable way. Accordingly, the authentication manager and the service provider may be separate functional units in one computer or functional units in different computers. The setup of the service provider and connection between the service provider and the authentication manager are known per se and will not be further discussed in this application. For example, the setup could be arranged as is described in WO 02/01325 of the same applicant, said document hereby incorporated by reference.

The service provider could be any type of remote services requireing Authentication and involving a user and a transaction system such as an Internet based shopping site, Internet banking or an automatic teller machine (ATM) at a bank.

The system further comprises a digital network 4 connecting the input device and the authentication manager. For example, the network could be a wide area network (WAN), such as the Internet.

Figure 2:
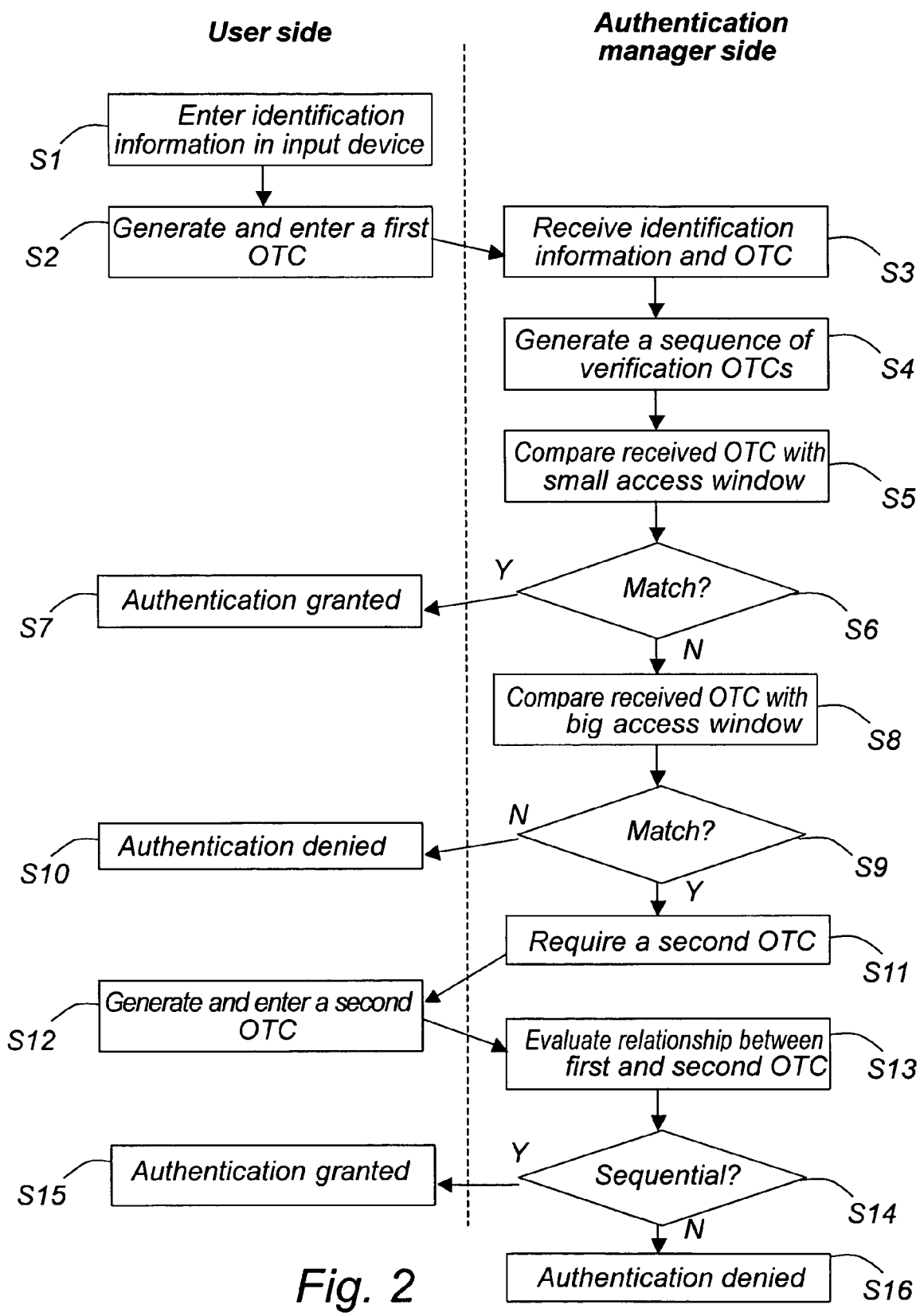
FIG. 2 is a schematic flow chart illustrating an authentication process according to an embodiment of the invention.

The authentication and synchronization process according to an embodiment of the invention will now be described with reference to FIG. 2. The user first enters identification information to the authentication manager through the input device, step S1. The identification information could be a identification code, a password, or any other type of information making it possible to identifiy the user.

Further, the user retrieves a one time code (OTC), step S2. As already discussed, such OTCs could be provided to the user by means of a sequence of codes to be used one time each, and perhaps in a pre-determined order. However, preferably the OTCs are generated by means of a OTC generation unit, in which a new code is generated each time it is used, based on personalizing information provided by the user, such as a personal PIN-code. However, the personalizing information may also be provided in other ways, as is obvious for someone skilled in the art. For example, the personalizing information may be provided automatically by entering e.g. a SIM-card or a smart card dedicated to the user into the OTC generation unit. In case such personal cards are used, the entry of an additional PIN-code may be superfluous. Such an OTC generation unit could be a specifically developed device with entering means such as a keyboard, a display, a processor for generating the code, etc. Alternatively, the device could comprise a reader for so called smart cards or integrated circuit card (ICC), i.e. cards provided with a chip. The reader is capable of reading out information from the card, and together the arrangement generates, e.g. as a response to a signal from the reader, a one-time identification code that could be used by the user to authenticate himself when making transactions via a digital network. The OTC generation unit is preferably portable an not connected to the communication network. The OTCs are preferably non-recurring strings of characters. The OTC generation unit could either be a unit dedicated only for OTC generation, or be integrated in e.g. a PDA or a mobile phone.

It is further preferred that the OTC generation unit calculates the OTC based on synchronization data, such as a sequence number or a time value, said synchronization data being automatically incremented and/or updated each time an OTC is generated, at regular time intervals, or any other regularly occurring event.

The identification information and the OTC as entered to the input device is then forwarded through the communication network to the authentication manager, step S3.

The authentication manager makes a preliminary identification based on the identification information, e.g. by matching the information with a user information database. Based on said preliminary identification, a sequence of verification OTCs associated with said user is identified in the authentication manager, step S4. This sequence is in this application generally referred to as "the big access window" or simply the "big window". The sequence could be a pre-stored set of predetermined OTCs or be generated based on verification synchronization data held by the authentication manager, depending on the OTC generation process used at the user side. The sequence should comprise at least two OTCs, and preferably more than five, and most preferably at least 10. In case of OTC generation with sequence numbers, the sequence could comprise OTCs based on the currently held sequence numbers and a number of following sequence numbers.

One or several of the OTCs in the verification OTC sequence are then chosen as the most probable, i.e. what is in this application referred to as "the small access window" or simply the "small window". For example, four OTCs could be chosen. The first OTC in the sequence is normally chosen as the most probable, and, further, the most probable OTC is normally the one based on the latest updated synchronization data. In case several most probable verification OTCs are used, the most probable of the remaining OTCs are added until a predetermined number of OTCs are obtained. In a preferred embodiment 2-5 most probable OTCs are chosen as the small access window, and most preferably about four. In case OTC generation with sequence numbers is used, the most probable OTC is normally the one based on the latest updated sequence number, the second most probable the next sequence number after the latest updated sequence number, the third most probable the second sequence number after the latest updated sequence number, and so on.

By using a small access window instead of just one chosen OTC, the security level is slightly decreased, but on the other hand, minor synchronization deviations are accepted without the user even noticing it.

The chosen verification OTC, i.e. the small window, and the OTC received from the input device are then compared, step S5, and in case of a match, step S6, the user is authenticated to the system, and admitted access to the requested service, etc, step S7.

In case the OTC received from the user match a verification OTC within the small access window, but not the first, most probable verification OTC, this indicates a slight synchronization deviation. In that case, the synchronization data held by the authentication manager could be automatically adjusted in accordance with the synchronization data on the user side. Thus, an automatic re-synchronization is achieved.

If the chosen verification OTC(s) and the OTC received do not match, this indicates a too large synchronization deviation, or an erroneous OTC entry. In this case, at least a part of the remaining sequence of verification OTCs is searched for a verification OTC matching the OTC received from the user, step S8. The remaining sequence comprises the whole sequence, i.e. the whole big window, except the chosen OTC(s), i.e. the small window, already being evaluated.

In case such a matching verification OTC is identified, step S9, another, second OTC is required from the user, step S11. For example, a request could be presented to the user in writing through the input device interface, such as "Error OTC, please enter a new OTC". The second OTC received from the user, step S12, is then compared with the OTC of the verification OTC sequence being subsequent to the identified matching verification OTC, step S13. In case the first and second OTCs provided by the user are found to be sequential, the user is authenticated to the system, step S15.

Hereby, the whole sequence forms the big window for access, and the small access window discussed previously forms a part of this big window. If the OTC provided by the user is within the small window, the user is directly authenticated and granted access to the system. If the provided OTC is outside the small window but within the big window, the authentication manager saves the first OTC, and a second OTC is required from the user. If the new, second OTC and the first OTC are in sequence, the end user will be authenticated, and admitted access to the system and the requested service.

In case of a second match authenticating the user to the system this indicates a synchronization deviation. In that case, the synchronization data held by the authentication manager could be automatically adjusted in accordance with the synchronization data on the user side. Thus, an automatic re-synchronization is achieved.

Preferably, such an automatic re-synchronization is made every time a user is successfully authenticated, regardless of the way the authentication was achieved, i.e. the number of OTCs entered, the tests made on the received OTCs, etc.

If the second OTC supplied by the user does not match the subsequent verification OTC in the authentication manager the user could be regarded as unauthorized, and denied further access to the system and/or the requested service, step S15. Alternatively, more cumbersome verification and synchronization processes may be used at this stage. Such more rigid and complex processes are per se well known, and will not be discussed further.

The system may also comprise encryption and decryption devices. In that case, at least part of the communication between the input device and the authentication manager could be encrypted, whereby the security level is increased even further.

Advantageously, the OTC generation unit possessed by the user could be of the type where a number of different sets of personalizing information could be used for generation of different OTCs for a number of different authentication managers and/or service providers. Such a case enables a user to use one and the same authentication arrangement when making transactions with different authentication managers and service providers.

Figure 3:
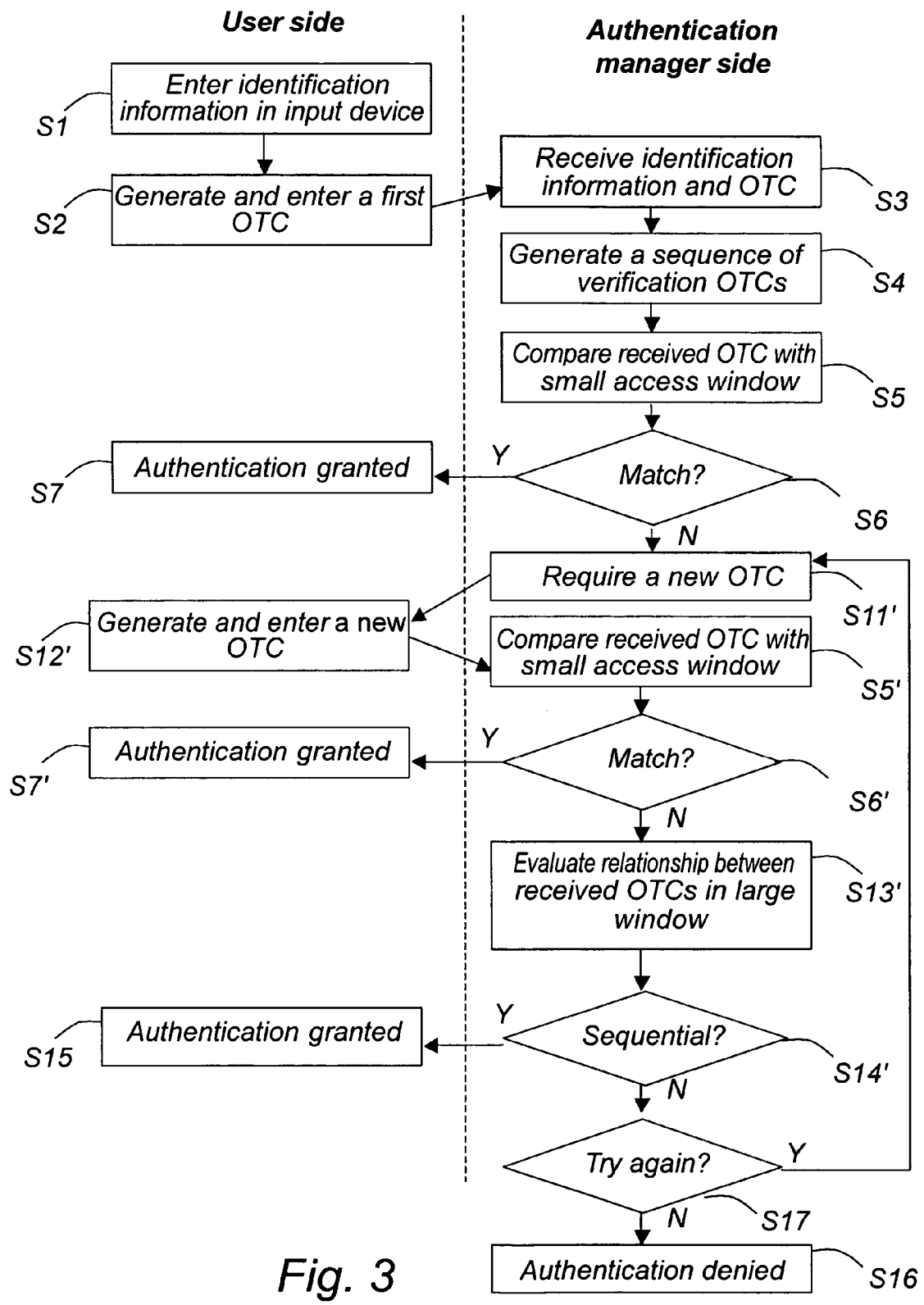
FIG. 3 is a schematic flow chart illustrating an authentication process according to a second embodiment of the invention.

A second embodiment of the invention will now be discussed with reference to FIG. 3. In this regard it is to be understood that all aspects discussed above in relation to the first embodiment also are applicable for this second embodi- In the method according to the second embodiment a first OTC is first requested and analyzed in step S1-S6. In case of a non-match, i.e. when the received OTC is not found in the small window, a new OTC is immediately requested while storing the previously entered OTC, step S11'.

A new OTC is then generated, step S12', and is, when received, compared with the small access window in the same way as the previous comparison, step S5'. In case of a match for the newly received OTC, step S6', authentication is granted, step S7'. Hereby, cases such as when the first OTC has been entered erroneously, errors has occurred due to transmission problems etc, are taken care of, since the same problem is unlikely to happen twice in a row.

However, in case the newly received OTC is found not be within the small access window in step S6', the newly received OTC and the previously received OTC are evaluated based on match within the large window, and a possible sequentiallity. This is tested in step S13' in a similar way as described above. In case the OTCs are in sequence in the large window, step S14', authentication is granted, step S15.

In case the OTCs are not in sequence and/or not in the large window, authentication may be denied. However, it is also possible to try once more, step S17, and request a new OTC and test it the same way as before, i.e. repeat the process from step S11' and forward. In this case, the sequentiallity of the OTCs may be tested in different ways, but preferably the latest received OTC is tested against the one or two OTCs received before that. Preferably at least one repetition is granted in step S17, whereby the user will be permitted to enter at least three different OTCs before the process is interrupted and authentication is denied, step S16.

As already discussed, the authentication process may proceed after the authentication denial step to more cumbersome verification and synchronization processes. For example, the user may here be requested to produce two OTCs at the same time, and said OTCs may be tested against the large window and for sequentiallity.

With respect to all aspects of the invention, computer software implementation is obviously preferred. The software of the authentication manager and service provider may be present in more or less traditional computers, and the software at user side may be within smart cards or other portable units having processing-and storage means.

The invention has now been described by way of preferred embodiments. However, many different modifications and alternatives are possible. For example, the OTCs may be generated in different ways than by calculations based on sequence numbers. Several such ways of obtaining OTCs would be available for someone skilled in the art.

The invention claimed is:

1. A method for authenticating a user in a digital communication system, said system comprising at least one input device providing a user interface to the system, an authentication manager for authenticating the user to the system and a communication network connecting said input device and said authentication manager, said method comprising:
   receiving identification information about the user at said authentication manager from said input device;
   receiving a one time code (OTC) at said authentication manager from said input device;
   identifying, based on said identification information, a sequence of verification OTCs associated with said user, said sequence of verification OTCs forming a big access window;
   choosing at least one of the verification OTCs of said sequence, said chose verification OTCs forming a small access window; and
   comparing the at least one chosen verification OTC of the small access window and the OTC received from the input device, and in case of a match authenticating the user to the system;
   and in case of a non-match:
   requiring a second OTC from the user;
   searching at least a part of the remaining sequence of verification OTCs of the big access window for two verification OTCs in sequence matching the two OTCs received from the user; and
   in case of a match authenticating the user to the system.

2. The method of claim 1, wherein the OTC from the input device is generated by means of an OTC generation unit.

3. The method of claim 2, wherein the generation unit is adapted to generate the OTC based on input provided by a smart card held by the user.

4. The method of claim 2, wherein the OTC generation unit calculates the OTC based on synchronization data.

5. The method of claim 4, wherein the synchronization data is one of a sequence number or a time value.

6. The method of claim 4, wherein the step of choosing the verification OTCs is made based on verification synchronization data held by the authentication manager.

7. The method of claim 6, wherein in case of a second match authenticating the user to the system, the verification synchronization data is subsequently updated in accordance with the identified matching verification OTCs.

8. The method of claim 1, wherein the step of identifying a sequence of verification OTCs associated with said user, comprises the step of calculating a sequence of OTCs.

9. The method of claim 1, wherein the step of identifying a sequence of verification OTCs associated with said user, comprises the step of retrieving a sequence of pre-stored OTCs.

10. The method of claim 1, wherein the OTCs are non-recurring strings of characters.

11. The method of claim 1, wherein the identification information comprises an identification code associated with the user.

12. The method of claim 1, wherein at least part of the communication between the input device and the authentication manager is encrypted.

13. The method of claim 1, wherein before the step of searching at least a part of the remaining sequence of verification OTCs, it further comprises the step of comparing the at least one chosen verification OTC and the second OTC received from the input device, and in case of a match authenticating the user to the system.

14. An authentication system comprising:
   at least one input device providing a user interface to the system;
   an authentication manager for authenticating the user to the system; and
   a communication network connecting said input device and said authentication manager;
   said authentication manager being configured to
   receive identification information about the user at said authentication manager from said input device;
   receive a one time code (OTC) at said authentication manager from said input device;
   identify, based on said identification information, a sequence of verification OTCs associated with said user, said sequence of verification OTCs forming a big access window;

choose at least one of the verification OTCs of said sequence, said chosen verification OTCs forming a small access window; and compare the at least one chosen verification OTC of the small access window and the OTC received from the input device, and in case of a match authenticate the user to the system; and in case of a non-match:

require a second OTC from the user;

search at least a part of the remaining sequence of verification OTCs of the big access window for two verification OTCs in sequence matching the two OTCs received from the user, and in case of a match authenticate the user to the system.

* * * * *